UNITED STATES PATENT OFFICE.

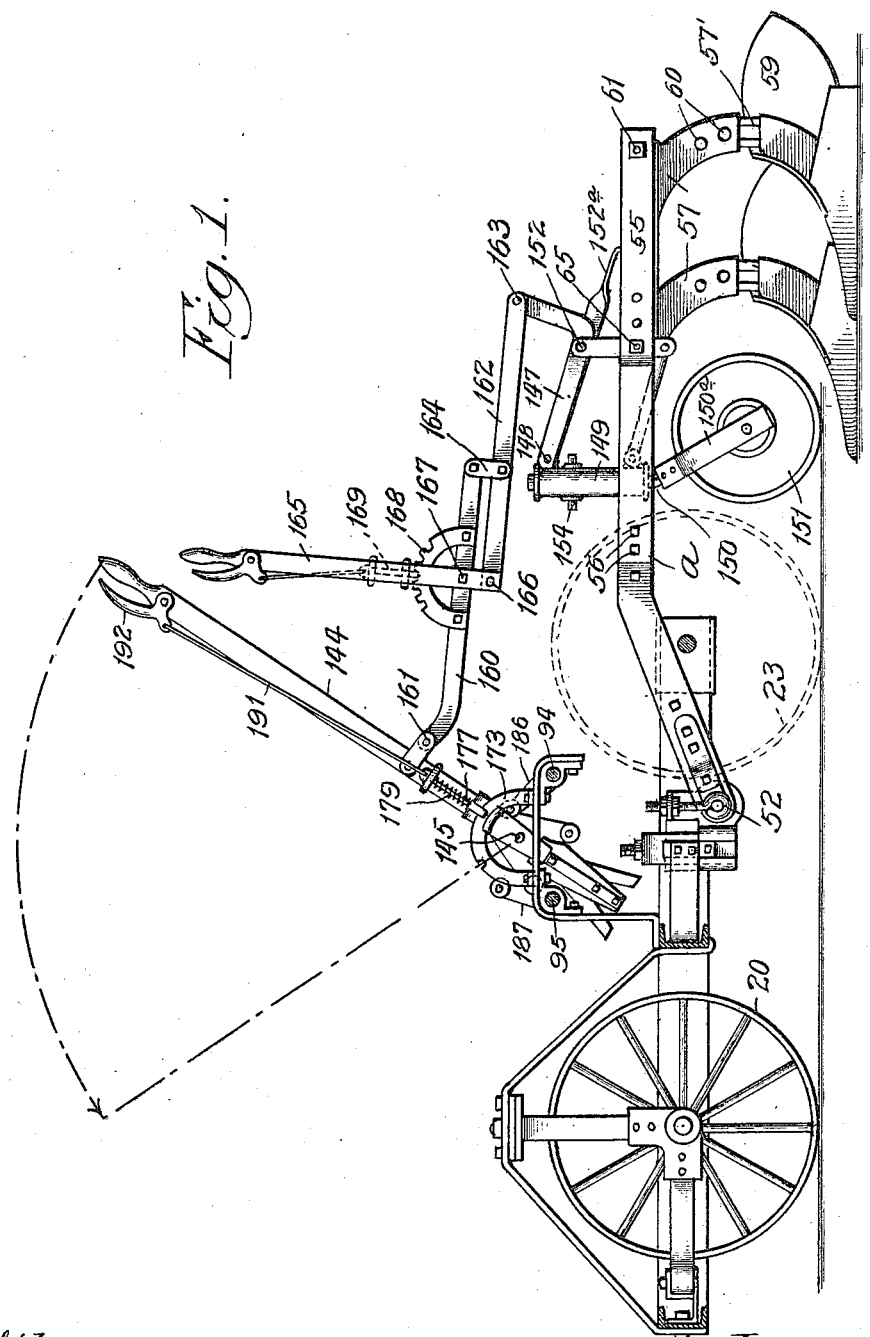

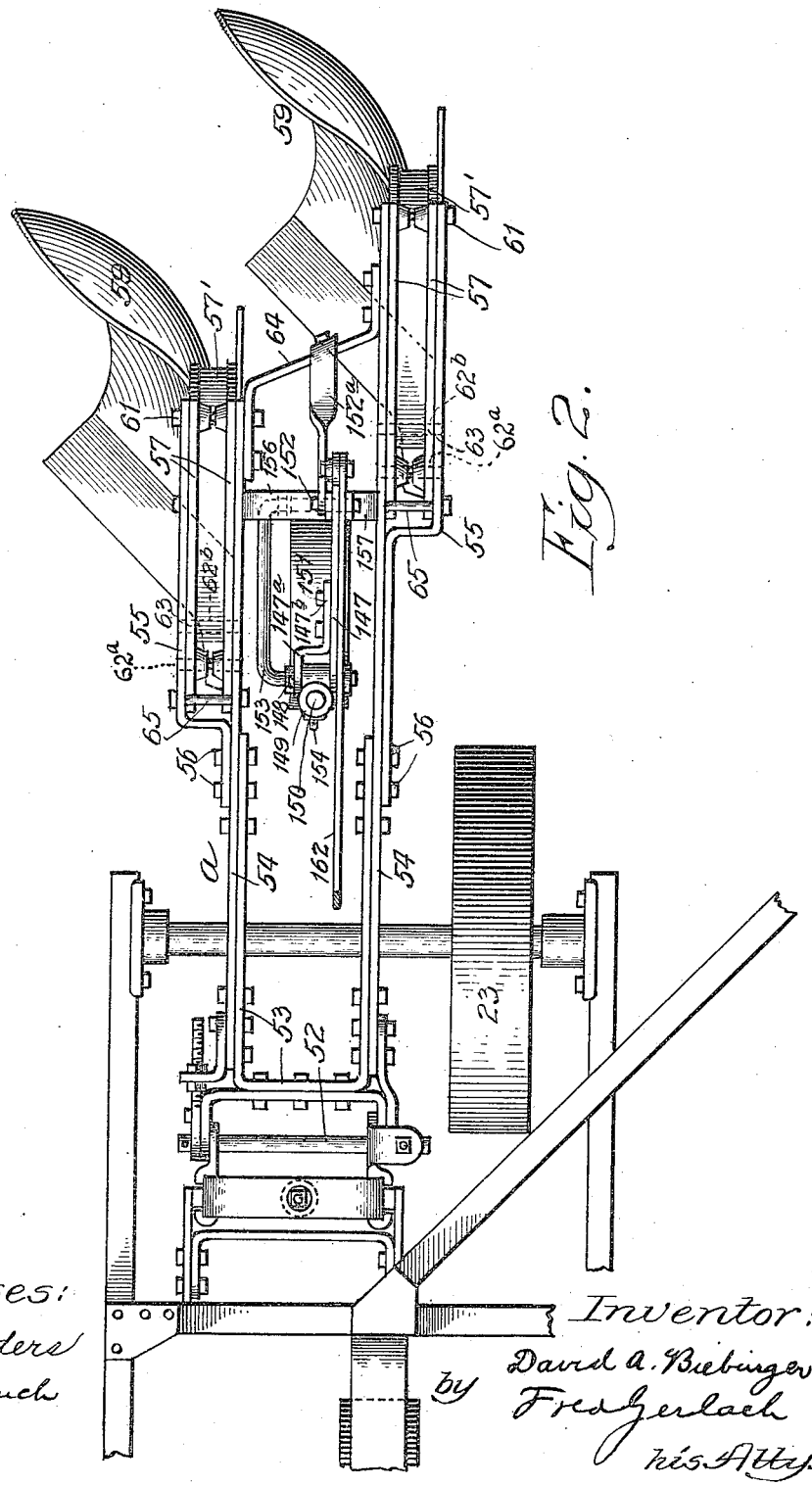

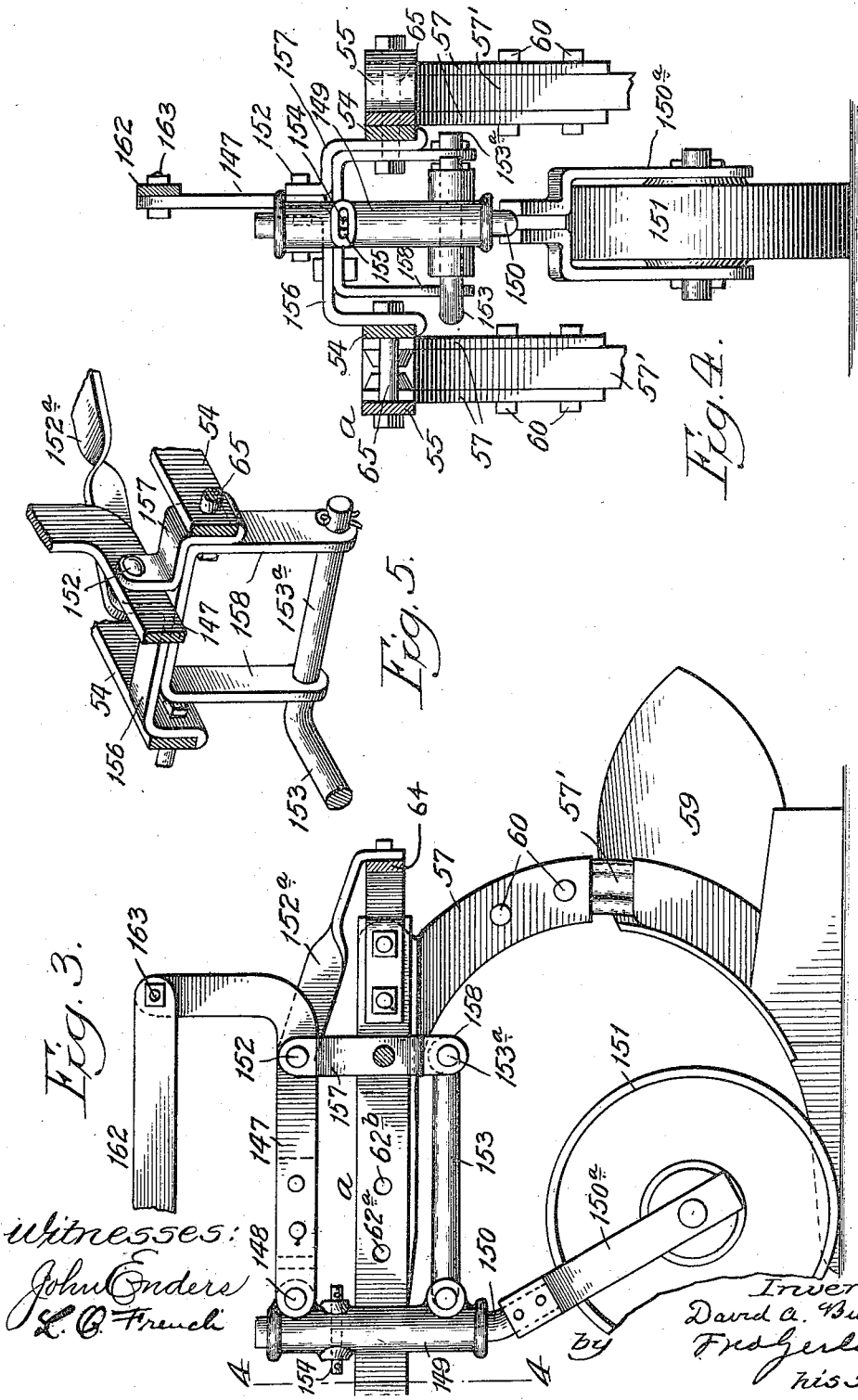

DAVID A. BIEBINGER, OF MOLINE, ILLINOIS, ASSIGNOR TO LA CROSSE PLOW CO., OF LA CROSSE, WISCONSIN, A CORPORATION OF WISCONSIN.

PLOW.

1,232,483. Specification of Letters Patent. Patented July 10, 1917.

Original application filed August 24, 1912, Serial No. 716,925. Divided and this application filed November 10, 1913. Serial No. 800,053.

*To all whom it may concern:*

Be it known that I, DAVID A. BIEBINGER, formerly of La Crosse, Wis., a resident of Moline, in the county of Rock Island and State of Illinois, have invented certain new and useful Improvements in Plows, of which the following is a full, clear, and exact description.

The invention relates to plows and more particularly to that type in which a gage-wheel is employed in connection with the plow carrying beam or frame.

The invention designs to provide improved mechanism between the gage-wheel and the plow beam for raising and lowering the beam and the plowshare or shares carried thereby.

The invention further designs to provide an improved operating linkage and connection between the gage-wheel and the plow-carrying structure.

The invention consists in the several novel features hereinafter set forth and more particularly defined by claims at the conclusion hereof.

In the drawings: Figure 1 is a vertical section of a plow embodying the invention. Fig. 2 is a plan of a portion of the plow embodying the invention. Fig. 3 is a detail elevation of the gage-wheel linkage. Fig. 4 is a section taken on line 4—4 of Fig. 3. Fig. 5 is a perspective of the connection between the gage-wheel linkage and the plow-beam.

The improved machine comprises a suitable supporting-frame mounted upon carrying-wheels 20 and 23. This frame is adapted to be hitched to a tractor and to be operated thereby, as well understood in the art. Each plow beam *a* is pivotally connected at its front end to a pivot pin 52 which permits the beam and plowshare or shares carried thereby to be raised and lowered.

Each plow beam is made up of wrought metal to provide a strong and durable construction and comprises a U-shaped bar 53 to each side of which a bar 54 is secured. To the outer side of each bar 54, the front end of a bar 55 is secured by bolts 56 which secure bars 53, 54 and 55 together. At the rear of each bar 54 and between each pair of bars 54 and 55, there is a pair of brackets 57 between which a plow-standard 57′ carrying a plowshare 59, is secured by bolts 60. A bolt 61 passes through each pair of brackets 57 and each pair of bars 54, 55 to pivotally connect the plow standard and share to its carrying beam. The front end of each pair of brackets 57 is provided with a hole 62$^b$ to receive a wooden break-pin 63 which extends through said hole and through corresponding holes in bars 55 and 54 of the beam, which permit the plowshare, upon breakage of the pin to swing rearwardly about bolt 61 and thus render that particular plow inoperative so that it will not be broken by the obstruction. A hole 62$^a$ is formed through each pair of brackets 57, each pair of bars 54 and 55 and standard 57′ to receive an additional break-pin, if desired. A brace 64 is secured to and extends between the rear end of bars 54 of the beam. The front end of each pair of brackets 57 abuts against a bolt 65 held in bars 54 and 55 to hold the front end of the bracket 57 against upward movement.

Each plow beam is supported by a gage-wheel 151. This gage-wheel is connected to a standard 150 by a fork 150$^a$. A sleeve 149 is carried by standard 150, the latter being rotatable in the sleeve to permit the gage-wheel to caster a limited extent. A pin 154 secured in standard 150 has projecting ends which are held in slots 155 in sleeve 149. This pin secures the standard and sleeve against relative vertical movement and permits a limited turning of the standard in the sleeve.

The gage-wheel is connected to the plow-beam by means of a link 153 which has its laterally turned front end pivotally held in a lug on the lower portion of sleeve 149 and its laterally turned rear end 153$^a$ pivotally held in pendent sides 158 of a U-shaped bracket which is rigidly secured to the plow beam. The gage-wheel is also connected to the beam by a bell-crank lever 147 which is fulcrumed on the plow-beam as at 152 and has its front end pivotally connected to the upper end of sleeve 149 by a pin 148 and a strap 147$^a$ which is pivotally connected at one end to the upper end of sleeve 149 by pin 148 and is bolted at its other end to the lever 147 as at 147$^b$. Pivot-bolt 152, which connects bell-crank lever 147 to the plow-beam, is carried in brackets 156, 157 which are secured to the inner sides of bars 54 respectively, the upper ends of said brackets being spaced apart to hold the bell-crank lever therebetween. The angular end 153ª of link 153 extends through both arms of brackets 158 to form a firm pivotal connection between said link and the plow beam. The brace 152ª connects bolt 152 and the brace-bar 64 which extends between bars 54 and secures their rear ends together.

Operation of bell-crank lever 147 causes it to swing about pivot 148 and to raise or lower pivot-bolt 152 and the plow-beam. The plow operating connection for operating the bell-crank lever comprises a lever 144 which is adapted to be operated manually or by power and is operatively connected by a linkage, comprising a link 160 which is pivoted to lever 144 at 161, a link 162 which is pivoted to bell crank lever 147 at 163, a short vertical link 164 which extends between and is pivoted to links 160, 162 and a depth-adjusting lever 165 which is pivoted at 166 to link 162 and to link 160 at 167. A rack 168 is bolted to link 160 and a finger operable lever-lock 169 is adapted to engage said rack to lock the lever in different positions. By adjusting lever 165, the length of the linkage between lever 144 and bell-crank lever 147 may be varied to cause the plows to assume a lower or higher position in the soil.

Lever 144 is suitably pivoted to the plow frame at 145 and is provided with a lock bolt 177 whereby the lever may be locked in position to hold the plow beam raised or lowered. This bolt is adapted to be operated by a finger-lever 192 to which it is connected by a rod 191 and is normally pressed into position to engage rack 173 by a spring 179. Lever 144 is adapted to be operated and released by power as more fully set forth in an application filed by me August 24, 1912, Serial No. 716,925, of which this application is a division. A shaft 94 is provided with a roller-carrying arm 186 which is adapted to release bolt 177 and shift lever 144 to lower the plow beam. A cross-shaft 95 provided with a roller carrying arm 187 is adapted to release the lock bolt 177 and to operate lever 144 into position to raise the plow, as more fully set forth in the aforesaid application.

From the foregoing description it will be obvious that when link 162 is operated, it will cause bell-crank lever 147 to rock about its pivot 148 and to raise or lower the plow beam, link 153 causing the sleeve 149 to remain substantially vertical as a result of the parallel movement between the horizontal arm of bell-crank lever 147 and link 153.

The construction described is one well adapted for heavy work and results in a strong and durable connection between the beam and the trail wheel.

The invention is not to be understood as restricted to the details set forth, since these may be modified within the scope of the appended claims without departing from the spirit and scope of the invention.

Having thus described the invention, what I claim as new and desire to secure by Letters Patent, is:

In a wheel plow, the combination of a frame, a plow supporting-beam pivotally connected to the frame, a gage wheel for said beam, a standard to which the gage wheel is connected, a sleeve on the standard, a bell-crank-lever pivoted to the beam and comprising a substantially horizontal forwardly extending arm and a substantially vertical arm, a pivotal connection between the sleeve and the forward end of the horizontal arm, a link pivoted to the beam and to the sleeve and substantially parallel to the horizontally extending arm, and a lifting connection pivotally connected to the upper end of the upwardly extending arm.

DAVID A. BIEBINGER.

Witnesses:
EDWARD L. EAGLE,
F. E. DAVIS.